United States Patent [19]

Garton

[11] Patent Number: 4,831,732
[45] Date of Patent: May 23, 1989

[54] PIPE CUTTER

[76] Inventor: Stephen D. Garton, 84 Twickenham Rd., Isleworth, Middlesex, Great Britain, TW7 6DL

[21] Appl. No.: 905,344
[22] PCT Filed: Dec. 11, 1985
[86] PCT No.: PCT/GB85/00574
 § 371 Date: Aug. 11, 1986
 § 102(e) Date: Aug. 11, 1986
[87] PCT Pub. No.: WO86/03439
 PCT Pub. Date: Jun. 19, 1986

[30] Foreign Application Priority Data
 Dec. 11, 1984 [GB] United Kingdom ................ 8431155
 Jun. 24, 1985 [GB] United Kingdom ................ 8515981

[51] Int. Cl.$^4$ .............................................. B23D 21/08
[52] U.S. Cl. ........................................ 30/101; 30/102
[58] Field of Search ...................... 30/92, 95, 101, 102

[56] References Cited

U.S. PATENT DOCUMENTS

| 1,431,546 | 10/1922 | Servais . | |
|---|---|---|---|
| 2,466,179 | 4/1949 | Milan | 30/102 |
| 3,249,998 | 5/1966 | Shultz | 30/101 |
| 3,715,804 | 2/1973 | Kelley | 30/102 |
| 3,795,051 | 3/1974 | Feamster | 30/101 |
| 3,932,937 | 1/1976 | Bastiansen | 30/102 |
| 4,422,238 | 12/1983 | Kloster | 30/101 |
| 4,438,562 | 3/1984 | Courty | 30/101 X |

FOREIGN PATENT DOCUMENTS 698113 5/1967 Belgium .
 310291 12/1955 Switzerland .

Primary Examiner—Douglas D. Watts
Assistant Examiner—Michael D. Folkerts
Attorney, Agent, or Firm—Rosen, Dainow & Jacobs

[57] ABSTRACT

A pipe cutter is formed as a cylinder with a longitudinal entry slot into which a pipe can be introduced to rest on rollers 101, 102 by pushing back cutter wheel 110 against a weak biasing spring until it snaps into cutting position. As the cylinder is thereafter manually turned around the pipe, cutter wheel 110 rotates by friction. Its shaft 111 rolls in arcuate slots in yokes 106, and approaches the pipe, so that the cutting edge of wheel 110 enters and severs the pipe. Cutting pressure is exerted by yokes 106 pivoting at 105 outwards so that nodules 106a tend to lift spring-casing 107, secured only at 108, 109 and encounter its prounced inwardly biassing force.

15 Claims, 3 Drawing Sheets

PIPE CUTTER

This invention relates to a pipe cutter.

Pipes that require to be cut are often situated in confined spaces, e.g. under floor boards or close to walls.

Existing types of pipe cutters tend to have an awkward shape requiring a comparatively large clearance around the pipe when they are used.

Thus, a well known design of pipe cutter is based on a metal frame shaped as a rectangular "C" shape. A feed screw is threaded in the base of the C, parallel to the side, so that turning an external end knob moves the screw, and a freely rotatable circular cutting blade journalled at its other end, towards the inside of the top of the "C" whereat two rollers are located to hold a length of pipe so as to permit relative rotation.

The screw is adjusted outwards to accommodate the pipe of any dimension, and tightened. Then the whole device is rotated around the pipe, to cut into the pipe. As the whole device is rotated, the knob is also from time to time tightened up.

Not only this technique difficult, especially in confined spaced, but also the uneven cutting pressure often resulting from this action tends to leave a high degree of distortion to the pipe, particularly with ductile materials, which effectively reduces their bore size.

It is also noted by the inventor that domestic and industrial piping now comes in a limited range of standard diameters.

The earlier device described and ( other more complicated devices known primarily from Patent literature) are well capable of use with a wide range of diameters of piping. The present inventor has observed, however, that in practice domestic and industrial piping comes only in a few standard diameters, and has accordingly approached the problem differently. The present invention envisages a device non-adjustable, or of only limited adjustment capability, as to diameter though capable of enbodiment in a number of sizes, e.g. as a plumbers kit for standard central-heating installation or repair. Thus, there may be provided an easy to grip, comparatively small, pipe cutter which has a snap on/-off action on a given size of pipe. Moreover, the cutting wheel derives an inward feed by the direct result of rotating the device around the pipe, to give uniform cutting pressure and thus minimal distortion.

In one aspect, the present invention consists in a pipe cutter for receiving a pipe in a holder permitting relative rotation, comprising a circular cutting blade caused to rotate by frictional contact of its edge with the pipe on such relative rotation and mounted on a shaft means which rolls along an arcuate surface in the holder as the blade rotates, the arcuate surface being so shaped as to cause the cutting edge to enter the wall of the pipe.

More specifically, the invention consists in a pipe cutter comprising a circular cutting blade of diameter $d_1$ mounted on a shaft means of diameter $d_2$ and a holder defining (a) an opening to accept pipe of diameter $d_3$ and wall thickness t and to constrain relative rotation of the holder and the pipe about a centralpoint P fixed in relation to the holder and (b) an arcuate surface parallel to the pipe direction the distance of which from point P smoothly decreases from a value of $(d_1+d_2+d_3)/2$ to a value not greater than $(d_1+d_2+d_3)/2-t$, for constraining the movement of the cutting blade shaft means, as it is caused to rotate by the frictional engagement of the pipe with the edge of the blade, to follow the arcuate surface until the pipe is severed.

The holder may, for example, be a member easily graspable in one hand, having a central hole communicating with a slot extending along its length so that it can be pushed longitudinally over a pipe.

It is possible that some tolerance can exist in the pipe diameter i.e. distance $d_3$ even without making the holder actually adjustable. For instance, the holder may have a suitably contoured recess or support rolls, to hold the pipe.

The arcuate surface may be fixed, but is preferably slightly movable against a spring-bias to facilitate smooth operation. Surrounding strip springs, e.g. constituting part of the slot surface, or even constituting an external housing, can be used.

The cutting wheel may also be minimally biassed towards the front end of the slot, in the "slot" direction by an amount easily overcome by finger pressure. This ensures that the wheel is prominent to the user, and typically has to be pushed to one side before commencing. Moreover, it helps positive engagement at all times with the pipe surface.

If size-adjustment is required the present invention can provide a pipe cutter, as defined generally above, in which a first carrier assembly slidably engages a second carrier assembly to a known extent governable by a pre-adjustment device permitting relative immobilisation of the carrier assemblies, the spacing between opposed portions of the carrier assemblies being thereby altered, one of the said opposed portions including the arcuate surface, and presenting the edge of the circular cutting blade and the other of the opposed portions presenting support means biassed towards said blade, whereby a pipe within a range of dimensions can be accommodated within the opposed carrier portions by adjustment of the pre-adjustment device and immobilisation of the carrier assemblies, and rotation of the cutter about the pipe causes the blade to rotate and sever the pipe by travel of the shaft means along the arcuate surface.

The support means is again preferably two rollers parallel to each other and to the eventual pipe laid upon them. They can be mounted upon a joint rollercarrier, biassed by a compression spring member. This spring member itself may be adjustable in the amount of compression by means of for example a central adjusting screw.

In a convenient adjustable embodiment, one of the carrier assemblies is formed as two symmetrical halves defining between them a space within which the other carrier assembly is accommodated and within which it is immobilisable by the adjustment means. This adjustment means may be a manually turnable screw, preferably associated with a scale which can be if desired calibrated directly into desired pipe sizes.

Such an adjustable device tends to be more or less rectangular in shape with carrier portions at each end, the adjustment screw along one long edge for adjustment and immobilisation of the carrier assemblies, and a central gap presenting the operative portion at the middle of the other long edge. It is thus somewhat larger overall cylindrical than the embodiments shown elsewhere herein but it has the advantage of adjustability and still gives a clean and undistorted cut. It is of course still smaller than known prior art devices.

One particular useful embodiment of the present invention, consists in a pipe cutter, comprising:

two circular end plates each with a central hole and a slot extending therefrom to the periphery;

a resilient shell extending around the periphery of the end plates except where interrupted by the slot, the shell being secured at one end only;

two rollers within the shell, parallel to the cylindrical axis, journalled for rotation between the end plates and with part of their curved surfaces at or slightly radially inward of the end plate hole circumference;

a pair of spaced yoke members pivoted on a common longitudinal shaft extending between the end plates, each having an outwardly projecting portion underlying the cylindrical shell unattached end;

aligned arcuate slots in the yokes, generally diametrically opposite the rollers;

a circular cutting wheel located between the yoke members;

opposed cutting wheel shaft means located one in each slot;

the forward end of each slot being so located that when the shaft means are lodged thereat the cutting wheel is in a position to penetrate the pipe thickness;

a rearward point of each slot being located that when the shaft means are lodged thereat, the cutting wheel edge contacts the surface of the pipe; and biassing springs acting to bias the shaft means to the forward positions in the arcuate slots;

whereby a pipe of predetermined diameter may be pressed in the end plate slots, past the action of the biassing springs, to locate in the central hole resting on the rollers and against the cutter wheel, and upon relative rotation with the holder cause the shaft means to roll forward in the arcuate slots, against the resilient pressure exerted by the yoke outwardly-extending projections acting to lift the shell outwardly, until the pipe is severed.

Another particularly useful embodiment of the present invention consists in a pipe cutter comprising:

two generally cylindrical castings each with an axial hole and a slot extending therefrom to the periphery, assembled face-to-face to form a cylindrical body with an entry slot;

two rollers journalled for rotation within the cylindrical body, parallel to the cylindrical axis, with part of their curved surfaces at or slightly axially inward of the circumference of the axial hole;

a pair of arcuate strip springs held within the cylindrical body, to define with aligned cavities located one in each casing the inwardly spring biassed and radially outward face of an arcuate slot in each instance;

a circular cutting wheel located in a space defined by recesses in the abutting faces of the assembled castings;

opposed cutting wheel shaft means located one in each defined arcuate slot;

the forward end of each slot being so located that when the shaft means are lodged thereat the cutting wheel is in a position to penetrate the pipe thickness;

a rearward point of each slot being so located that when the shaft means are lodged thereat the cutting wheel edge contacts the surface of the pipe; and an arcuate biassing spring extending around a cavity in the cylindrical body to bias the shaft means to the forward positions in the arcuate slots:

whereby a pipe of predetermined diameter may be pressed into the entry slot in the cylindrical body, past the action of the arcuate biassing spring, to locate in the central hole resting on the rollers and against the cutter wheel and upon relative rotation with the holder cause the shaft means to roll forward in the arcuate slots against the resilient pressure exerted by the strip springs defining the slot radially outer faces until the pipe is severed.

Preferably abutting faces on the cylindrical castings carry opposed recesses to give on assembly an outwardly open part-peripheral slot to accommodate the outer edge of the cutter wheel in its inner position along the arcuate slots.

Preferably moreover, the cutter wheel is idly mounted upon its shaft means.

Specific embodiments of the invention will now be described by way of example with reference to the accompanying drawings in which.

Figure 1:
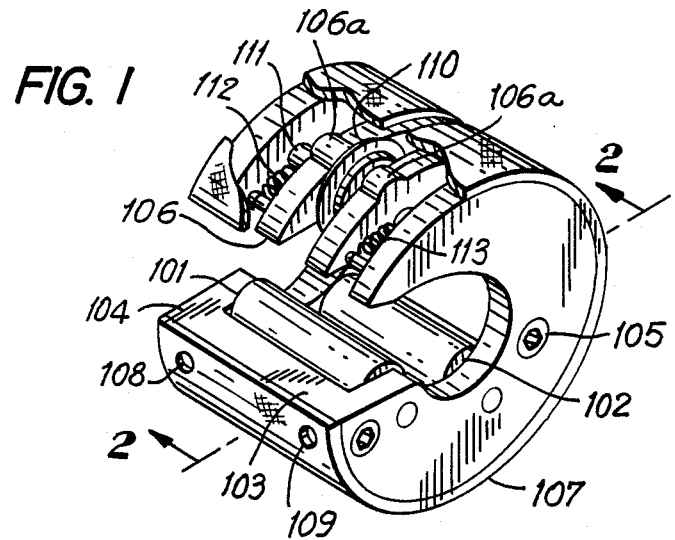
FIG. 1 shows the pipe cutter in a generally perspective view.
Figure 2:
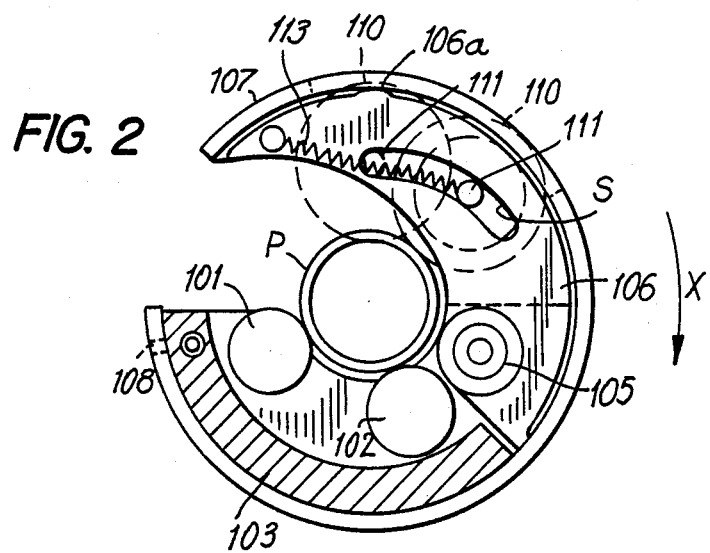
FIG. 2 shows a section through the pipe cuter of FIG. 1.

FIGS. 1 and 2 show an embodiment with at least one pipe engaging roller or like member 101, 102 a rigid "C"-shaped framework of end plates 103, 104 and, pivoted within the framework on a suitable shaft 105, an arm 106 (formed with two parallel yokes) restrained from moving outwards by suitable spring pressure. In this case, spring pressure is applied by nodules 106a projecting from arm 106, against outer cylindrical shell or casing 107, which is pre-stressed and extends around framework 103, 104 being fixed in position at lugs 108, 109 created on the surface of the framework.

Arm 106 is forked into two spaced yokes. Each yoke has an identical arcuate slot S which as shown in FIG. 2, has a distance from the centre of the device that decreases uniformly as the slot extends in the direction away from pivot shaft 105.

A cutting wheel 110 (or a V-groove cutter not shown) is situated in between the yokes and fixed on a shaft 111, which protrudes into each arcuate slot S on either side. At least one suitable spring 112,113 applies pressure to the cutting wheel 110, to bias it forward in the slot S, away from pivot 105, and towards the pipe entry position.

In use, when the device is placed over a pipe P, cutter wheel 110 becomes pushed back into the device, along the slot S in arm 106, and against springs 112, 113. When the pipe is fully home, as shown in FIG. 2, cutter wheel 110 springs forward from an extreme slot-end position to the approximate position shown in dashed lines in FIG. 2. This gives a "snap on" action over the pipe.

Rotation of the device in the direction of arrow X gives the cutter wheel 110 a drive from the differential motion between it and the pipe. Shaft 111 also revolves, and is pressed hard against the radially outer surfaces of the slot S in arm 106. The shaft 111 thus runs along these surfaces and there results a motion of the cutter wheel 110, along the slots S, until it reaches the forward end, as shown in dot-dash lines. At this stage nodules 106a press the spring constituted by casing 107 to an outer position to absorb excess pressure of cutter wheel 110, against the pipe. This stored pressure forces the cutter wheel 110 into the pipe, until such time as the pipe becomes severed through continual turning of the device.

When the device is rotated in the opposite direction, cutter wheel 110 will move back along the slots in arm 6. The force between cutter wheel 110 and the pipe will diminish and it will be easily possible to remove the device from the pipe.

Figure 3:
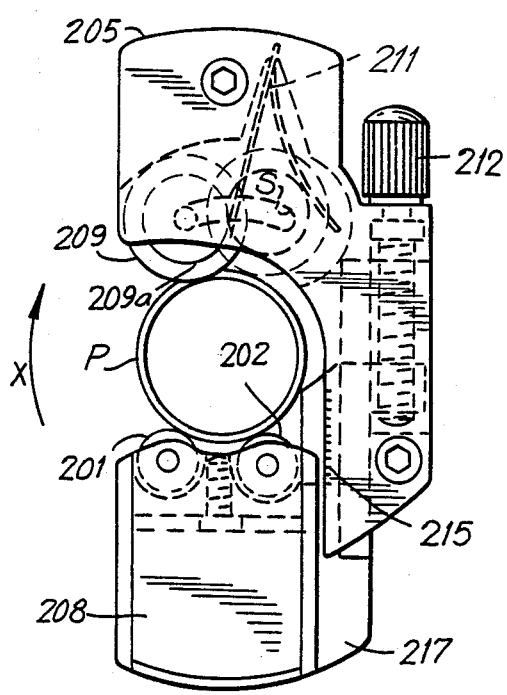
FIG. 3 is a side view of another embodiment of the invention.
Figure 4:
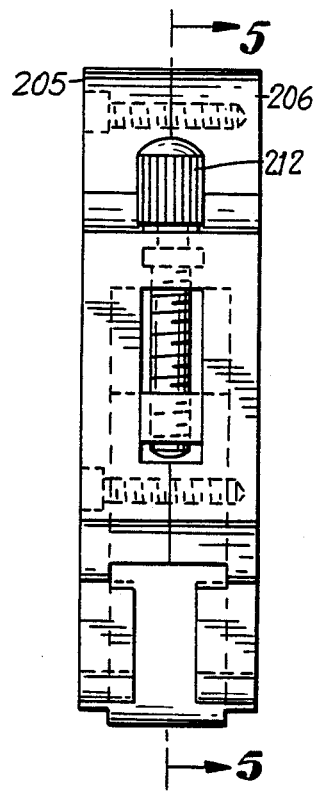
FIG. 4 is a back view of the embodiment of FIG. 3.
Figure 5:
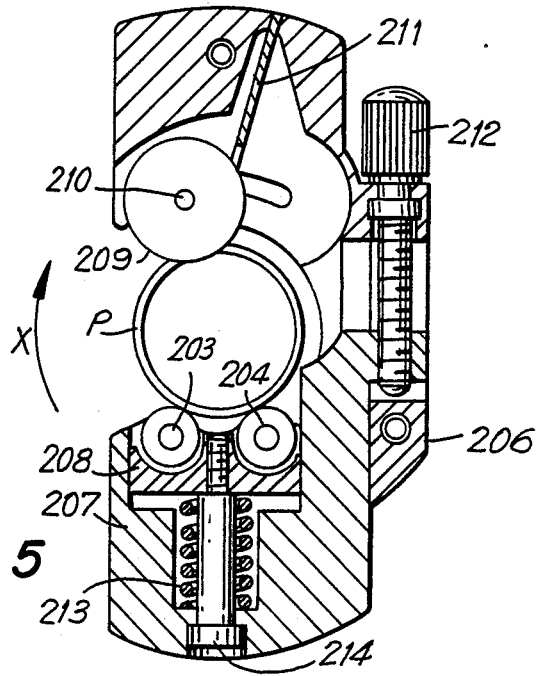
FIG. 5 is a longitudinal section along the section section line shown in FIG. 4.

The pipe cutter shown in FIGS. 1 and 2 has been designed to cut a particular size of pipe, though it will in fact tolerate comparatively small deviations from the selected outer and inner diameters. However, it could be made adjustable down to smaller diameters by the use of a mechanism which permits angular adjustment of arm 106 such that it could be locked down rigidly but still allowing any outward forces upon it to be against suitable spring pressure. FIGS. 3 to 5 show an alternative adjustable device.

Another possibility for the design is to omit surrounding spring casing 107 completely and rigidly fix arm 106 to, or make it part of, framework 103, 104. This is possible for certain sections of pipe but the diameters of the cutting wheel and its shaft would have to be considered carefully so as to give the desired cutter wheel feed rate.

The embodiment shown in FIGS. 3 to 5 comprises a first carrier assembly in the form of two identical halves 205 and 206 screwed permanently face-to-face and possessing like tail portions along which the adjustment screw 212 extends. The second carrier assembly 207, 208 is in the form of a single portion with an upward protrusion lying between the two tail portions of the first carrier assembly and secured thereto by the adjustment screw 212. Thus, the carrier assemblies jointly define two opposed portions with a gap for receiving the pipe P, and are relatively adjustable and immobilisable by virtue of screw 12 which alters and then fixes the relevant gap. The extent of the adjustment can be read from scale 215, directly as the pipe diameter if required.

One of the opposed carrier assembly portions, on carrier assembly 205, 206, is formed with opposed recesses in its two halves jointly defining an arcuate slot S accommodating the shaft 210 of cutting blade 209 as in FIGS. 1 and 2. The rotary cutting blade 209 is slightly spring biassed toward the outer end of the arcuate slot by leaf spring 211, which at its free end is bifurcated with a limb on each side of the wheel blade 209 to bear upon a protruding hub member 209a as shown.

The other opposing carrier assembly portion, on the carrier assembly 207,208, mounts two support rollers 203, 204 parallel to pipe P, in a common slide portion 208 biassed against compression spring 213 by an amount adjustable by a screw 214.

In use, and as in the embodiments of FIGS. 1 and 2, the operative pushes the device against the action of biassing spring 211 over a pipe P (in this case having first checked the adjusted size 215 and made whatever alterations may be necessary) and rotates it in the direction of arrow X until the blade 209, rotating on the pipe whilst moving down its arcuate support slot, severs the pipe wall. The necessary constant pressure is exerted throughout by spring 213.

Various modifications may be made by way of alteration or supplement to the illustrated embodiment. For example, even though the device is adjustable, it will often by used in a context where the plumber or other operative is cutting the same diameter pipe repeatedly over an extended period. To ensure that there is no unintentional readjustment of the gap it is envisaged that, for the sizes generally encountered, two screw-threaded small bores may be brought into register as between the tail portions of assembly 205, 206 and the enclosed portion of assembly 207, 208, whereby a small locking screw can be screwed into the aligned holes to maintain a given position for an extended period of work.

The device has intentionally been designed to be compact in nature and still requires little clearance about the pipe being cut. As with the embodiment of FIGS. 1 and 2 this is an advantage where space is restricted. The shape of the present cutter, however, also possesses advantages where there is unrestricted working space. Because it is generally rectangular in shape, it can in various ways be fitted to an extension arm to give extra leverage. Preferably, such an arm can be easily collapsible or removable so that the device can be again used in a restricted space if necessary.

It is an advantage of the embodiment shown in FIGS. 3 to 5, as in FIGS. 1 and 2, that the extent of deformation of the cut end of the pipe is minimal. However, it may from time to time, with different categories of material, arise that a burred or deformed edge is encountered. Attention is therefore drawn to the region 217 of the drawing. It is possible to supply this region of the device with a square socket to hold the shaft of an additional and associated tool which fits firmly in the socket and is provided with a de-burring or re-shaping tool on its end, either in the general continuation of the shaft direction or at right angles to the shaft.

Figure 6:
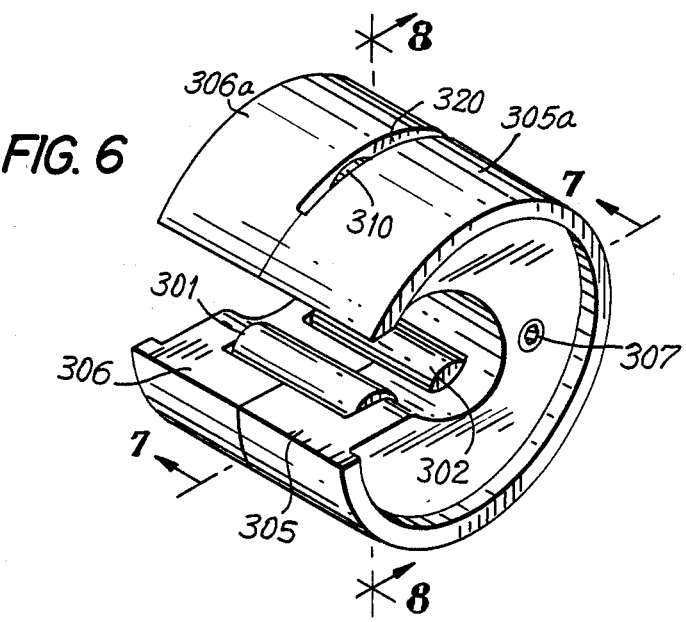
FIG. 6 shows a third embodiment of the invention of the invention in perspective view.
Figure 7:
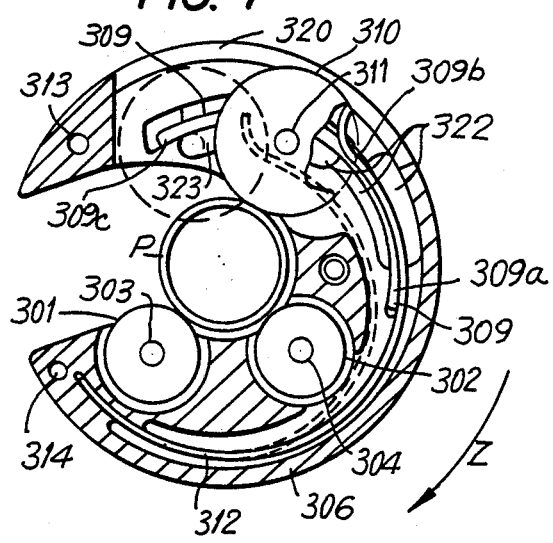
FIG. 7 shows a section along line X—X of FIG. 6.
Figure 8:
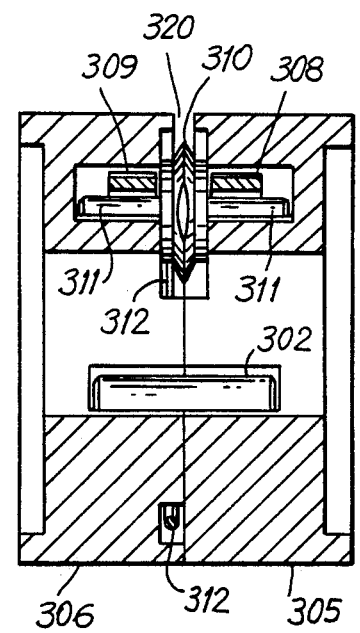
FIG. 8 shows a section along line Y—Y of FIG. 6.

FIGS. 6, 7 and 8 show two like C-shaped castings 305, 306, securely screwed together at 307 with the use of locating pins 313 and 314, and with roughened external gripping surfaces 305a, 306a. Between the castings there is defined an externally open slot 320 around part of the total circumference.

Across the castings extend two support rollers 301, 302. The castings are shaped to define an entry slot at the side, as in FIGS. 1 and 2, whereby a pipe P can enter and rest for rotation on rollers 301, 302.

A rotary cutter wheel 310 is mounted on a shaft 311 moveable within cavities 322 (one in each casting) containing a pair of strip springs 308,309. Which can alternatively, if desired, be embodied as a forked or bifurcated structure with an integral end portion. Cavities 322 are so shaped to hold the springs 309 by their resilience, braced against three points e.g.309a, 309b and 309c as shown. The forward ends of these springs e.g.between 309b and 309c is thus free and capable of flexure, defining in each case the radially outer face of one of a pair of arcuate slots 323, in which the shaft 311 may travel.

The assembly is completed by a thin biassing spring 312 for the positioning of cutter wheel 310. One such spring 312 is usually adequate, extending in a generally circular arc in a suitable body cavity.

To use the device the pipe P is pressed into the major entry slot. Initially, this forces the wheel 310 back, against spring 312, almost to its full travel (not shown) but, as above, the wheel then snaps forward to the full-line position shown, with the wheel edge within slot 320. Rotation of the device in the sense of arrow Z causes the wheel 310 to rotate and its edge to bite into the pipe material as it moves along the arcuate slots 323 with shafts 311 pressing against, and being pressed inwards by, springs 308, 309 which constrain the wheel into the necessary arcuate travel but permit rotation until the pipe P is cut with the wheel 310 where shown in dashed lines.

Cutter wheel 310 can be fixed or idle on shaft 311. In either case the device will work, since pressures exerted cause the shaft to turn with the wheel as this progress through the slot 323. However, an idly-mounted wheel 310 has an advantage in that when it reaches the (dashline) end of its travel it can be permitted to ride around its shaft, which can be relatively immobilised against rotation e.g. by flat portions at each end impinging on like flats at the slot 323 ends. This gives less wear, and the shaft 311 can be made of wear-resistant material and/or easily replaced.

In all of the above, the cutter wheel (110, 209, 310) is mounted for revolution, optionally fixed on a single shaft, or idly mounted on such a shaft, or as an integral structure with oppositely extending shaft portions. All of these possibilities are intended to be covered by the term 'shaft', 'shafts', or 'shaft means' as used herein.

The device shown in FIGS. 6, 7 and 8 can be rendered adjustable over a small range by selective separation of upper and lower casting portions using a locking screw interconnection e.g. somewhat as shown in FIGS. 3, 4 and 5. In practice, only a limited range of size adjustment, e.g. from 1:1 to 1.5:1 is thus available because of the spring arrangements.

I claim:

1. A pipe cutter comprising:
   a generally C-shaped housing having a central opening and a side slot extending into the opening which is configured to receive a pipe to be cut via the side slot,
   first means on one housing side extending into the central opening for engaging the pipe wall and allowing relative rotation of the housing with respect to the pipe,
   an arcuate surface having first and second ends on the opposite housing side,
   a shaft engaging the arcuate surface and movable therealong,
   a cutter wheel mounted on the shaft and having a cutting edge extending into the central opening generally opposed to the first means for engagement with an opposing side of the pipe wall and being caused to rotate upon relative rotation of the pipe and housing,
   first spring means urging the shaft toward the first end of the arcuate surface, sand cutting edge being closer to the first means when the shaft is at the first end of the arcuate surface and being further from the first means when the shaft is at the second end of the arcuate surface,
   said cutter being configured such that upon entrance of a pipe into the central opening via the side slot the shaft is caused to be moved toward the second end of the arcuate surface by the pipe engaging the cutting edge and moving it away from the central opening against the action of the first spring means, and upon rotation of the housing when the pipe is present in the central opening the shaft is caused by the spring means to be moved along the arcuate surface toward the first end of the arcuate surface moving the cutting edge inward toward the central opening to cut deeper and deeper into the pipe wall as the rotation continues until the pipe is severed.

2. A pipe cutter as claimed in claim 1, wherein the cutter wheel is circular of diameter $d_1$ mounted on the shaft of diameter $d_2$ and the housing defines (a) the opening to accept pipe diameter $d_3$ and wall thickness t and to constrain relative rotation of the housing and the pipe about a central point P fixed in relation to the housing and (b) the arcuate surface extends parallel to the long direction of the pipe the distance of which from point P smoothly decreases from a value at the second end of $(d_1+d_2+d_3)/2$ to a value at the first end not greater than $(d_1+d_2+d_3)/2-t$, for constraining the movement of the cutter blade shaft.

3. A pipe cutter as claimed in claim 1 or 2 in which said first means comprises a contoured recess or support rolls to hold the pipe.

4. A pipe cutter as claimed in claim 1 in which second spring bias means are provided for the arcuate surface such that it is slightly movable to facilitate smooth operation.

5. A pipe cutter as claimed in claim 4 in which the second spring bias means is one or more surrounding strip springs.

6. A pipe cutter as claimed in claim 5 in which the strip springs constitute part of the arcuate surface.

7. A pipe cutter as claimed in claim 6 in which the strip springs comprise part of said housing.

8. A pipe cutter as claimed in claim 1 in which the first spring means biases the cutter wheel toward its first end by an amount easily overcome by finger pressure.

9. A pipe cutter as claimed in claim 1 in which the housing comprises a first carrier assembly slidably engaging an opposed second carrier assembly and a pre-adjustment device for altering the spacing between opposed portions of the carrier assemblies and thereafter relatively immobilizing them, one of the said opposed portions including the the arcuate surface and presenting the edge of the cutter wheel and the other of the opposed portions presenting said first means biassed toward said wheel, whereby a pipe within a range of dimensions can be accommodated within the opposed carrier portions by adjustment of the pre-adjustment device and immobilization of the carrier assemblies, and rotation of the cutter wheel about the pipe cause the wheel to rotate and sever the pipe by travel of the shaft means along the arcuate surface.

10. A pipe cutter as claimed in claim 9 in which said first means is a pair of parallel rollers mounted upon a joint roller carrier biassed by a compression spring member.

11. A pipe cutter as claimed in claim 9 and having a generally rectangular shape with the carrier assemblies at each end, the pre-adjustment device comprising an adjustment screw along one long edge of the rectangle for adjustment and immobilization of the carrier assemblies, said first and second carrier assemblies defining a central gap at the middle of the other long edge of the rectangle.

12. A pipe cutter comprising
   two circular end plates each with a central hole and a slot extending therefrom to the periphery;
   a resilient cylindrical shell extending around the periphery of the end plates except where interrupted by the slot to define two ends, means for securing the shell at one end only to the end plates;
   two rollers within the shell, parallel to the cylindrical axis, journalled for rotation between the end plates and with a part of their curved roller surfaces at or slightly radially inward of the end plate circumference;
   a pair of spaced yoke members pivoted on a common longitudinal shaft extending between the end plates, each of said yoke members having an outwardly-projecting portions underlying the cylindrical shell at its unsecured other end;

aligned arcuate slots in the yoke members, generally diametrically opposite the rollers;

shaft means engaging the slots and movable therealong;

a circular cutting wheel located between the yoke members and mounted on the shaft means;

a forward end of each slot being so located that when the shaft means are lodged thereat the cutting means is in a position to penetrate the pipe thickness when the pipe is present within the central holes;

a rearward point of each slot being so located that when the shaft means are lodged thereat, the cutting wheel edge contacts the pipe surface; and biassing springs acting to bias the shaft means toward the forward ends of the arcuate slots;

whereby a pipe of predetermined diameter may be pressed in the end plate slots, against the action of the biassing springs, to locate in the central hole resting on the rollers and against the cutter wheel, and upon relative rotation of the cutter and the pipe the shaft means is caused to roll forward along the arcuate slots, against the resilient pressure exerted by the shell against the yoke outwardly-extending projections which bear against the shell and thus urging the yoke members inwardly, until the pipe is severed.

13. A pipe cutter comprising two generally cylindrical casings, each with an axial hole and a slot extending therefrom to the periphery, assembled face-to-face to form a cylindrical body with an entry slot, each said casing having a cavity aligned with each other;

two rollers journalled for rotation within the cylindrical body, parallel to the cylindrical axis, with a part of their curved roller surfaces at or slightly radially inward of the axial holes;

a pair of arcuate strip springs within the cylindrical body, to define with said aligned cavities an inwardly spring-biassed and radially-outward face of an arcuate slot;

a circular cutting wheel located in a space defined by recesses in the abutting faces of the assembled casings;

opposed cutting wheel shaft means located one in each defined arcuate slot;

a forward end of each slot being so located that when the shaft means are lodged thereat the cutting wheel is in a position to penetrate the pipe thickness when present within the central holes;

a rearward point of each slot being so located that when the shaft means are lodged thereat, the cutting wheel edge contacts the pipe surface; and an arcuate biassing spring extending around the cavity of the cylindrical body to bias the shaft means to the forward ends of the arcuate slots;

whereby a pipe of predetermined diameter may be passed into the entry slot in the cylindrical body, against the action of the arcuate biassing spring, to locate in the central hole resting on the rollers and against the cutter wheel, and upon relative rotation of the body and the pipe the shaft means is caused to roll forward in the arcuate slots, against the resilient pressure exerted by the strip springs defining the slot radially-outward faces until the pipe is severed.

14. A pipe cutter as claimed in claim 13 in which abutting faces on the cylindrical causing carry opposed recesses to form an open part-peripheral slot extending outwardly of the casing to accommodate the outer edge of the cutting wheel when in its innermost position.

15. A pipe cutter as claimed in claim 13 or 14 in which the cutter is idly mounted upon its shaft means.

* * * * *